Sept. 18, 1962 W. J. JAMES ETAL 3,054,530
REGISTERING APPARATUS FOR FLUID DISPENSERS
Filed Nov. 30, 1959 9 Sheets-Sheet 1

INVENTORS
William J. James
BY Hubert E. Friend
Manfred M. Warren
Their Attorney

Sept. 18, 1962 W. J. JAMES ETAL 3,054,530
REGISTERING APPARATUS FOR FLUID DISPENSERS
Filed Nov. 30, 1959 9 Sheets-Sheet 2

INVENTOR.
William J. James
Hubert E. Friend
BY
Manfred M. Warren
Their Attorney

Sept. 18, 1962  W. J. JAMES ETAL  3,054,530
REGISTERING APPARATUS FOR FLUID DISPENSERS
Filed Nov. 30, 1959  9 Sheets-Sheet 3
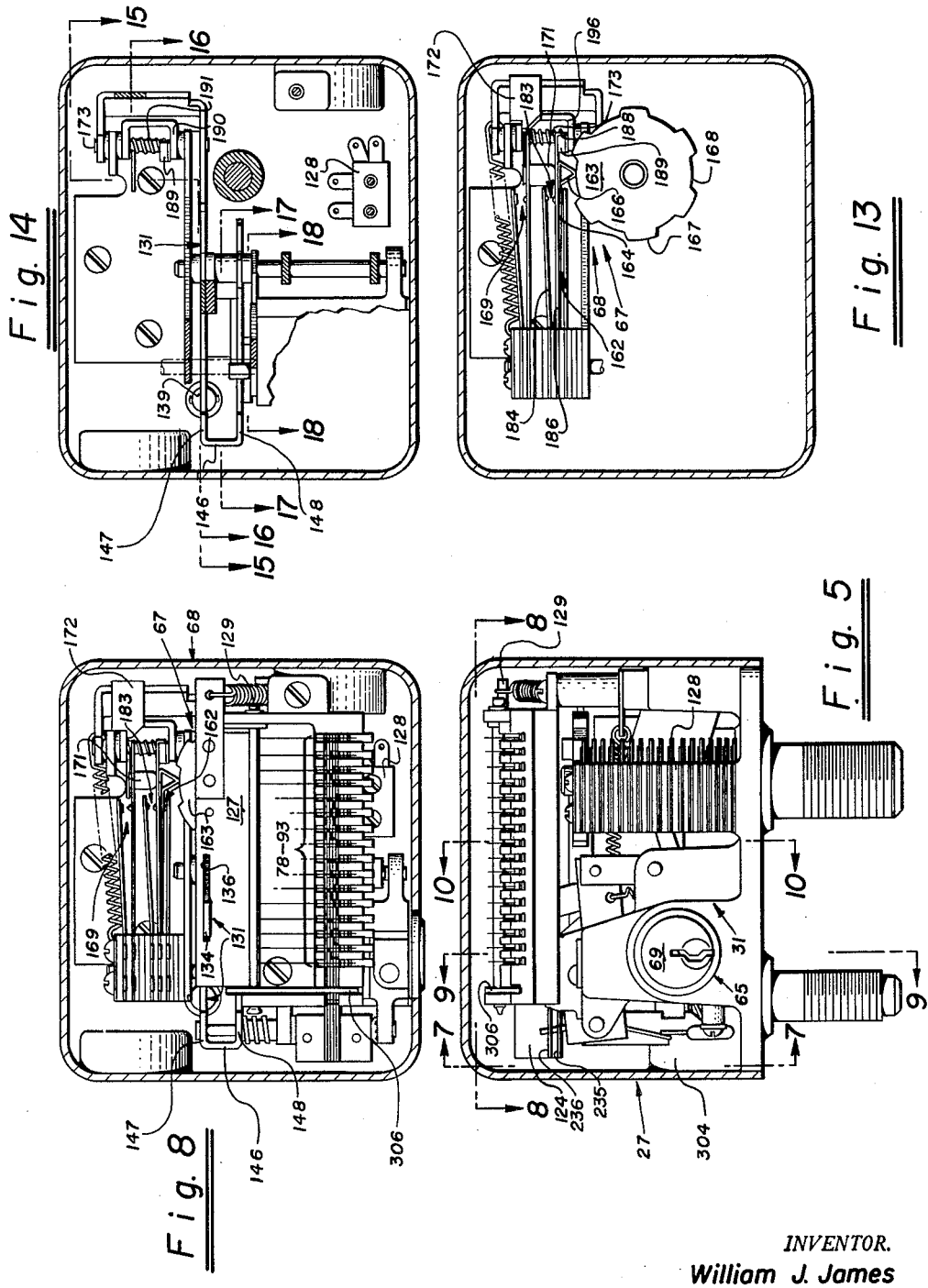
INVENTOR.
William J. James
BY Hubert E. Friend
Manfred M. Warren
Their Attorney

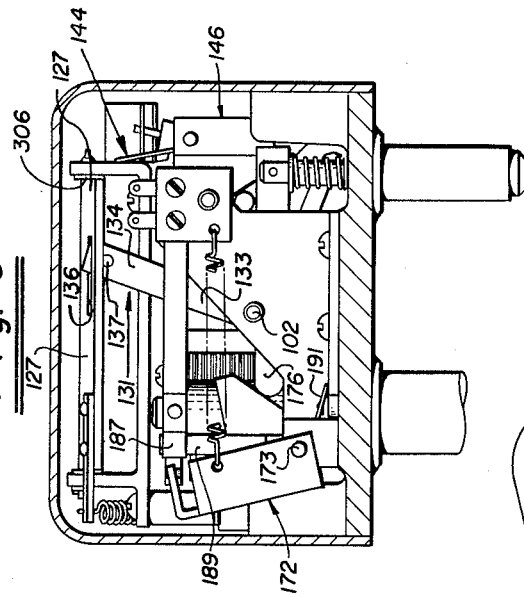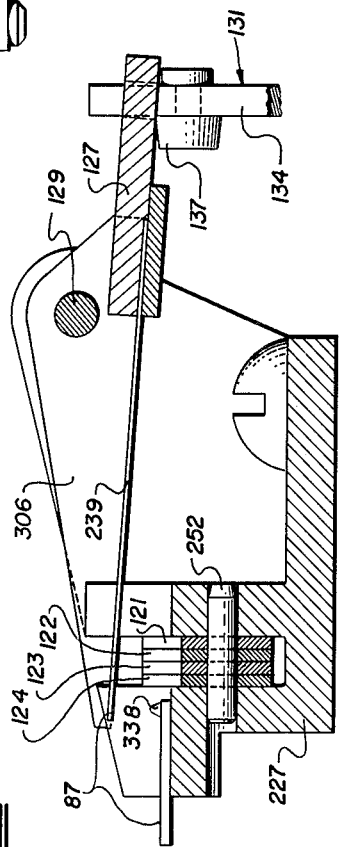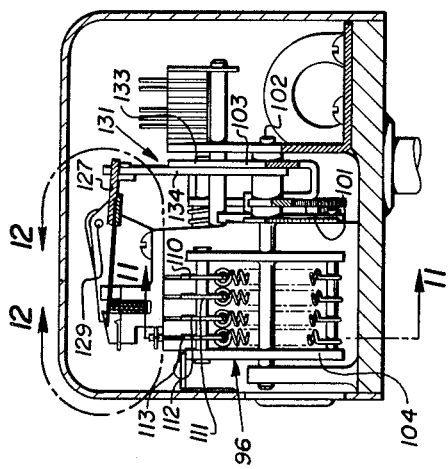

Sept. 18, 1962 W. J. JAMES ETAL 3,054,530
REGISTERING APPARATUS FOR FLUID DISPENSERS
Filed Nov. 30, 1959 9 Sheets-Sheet 5
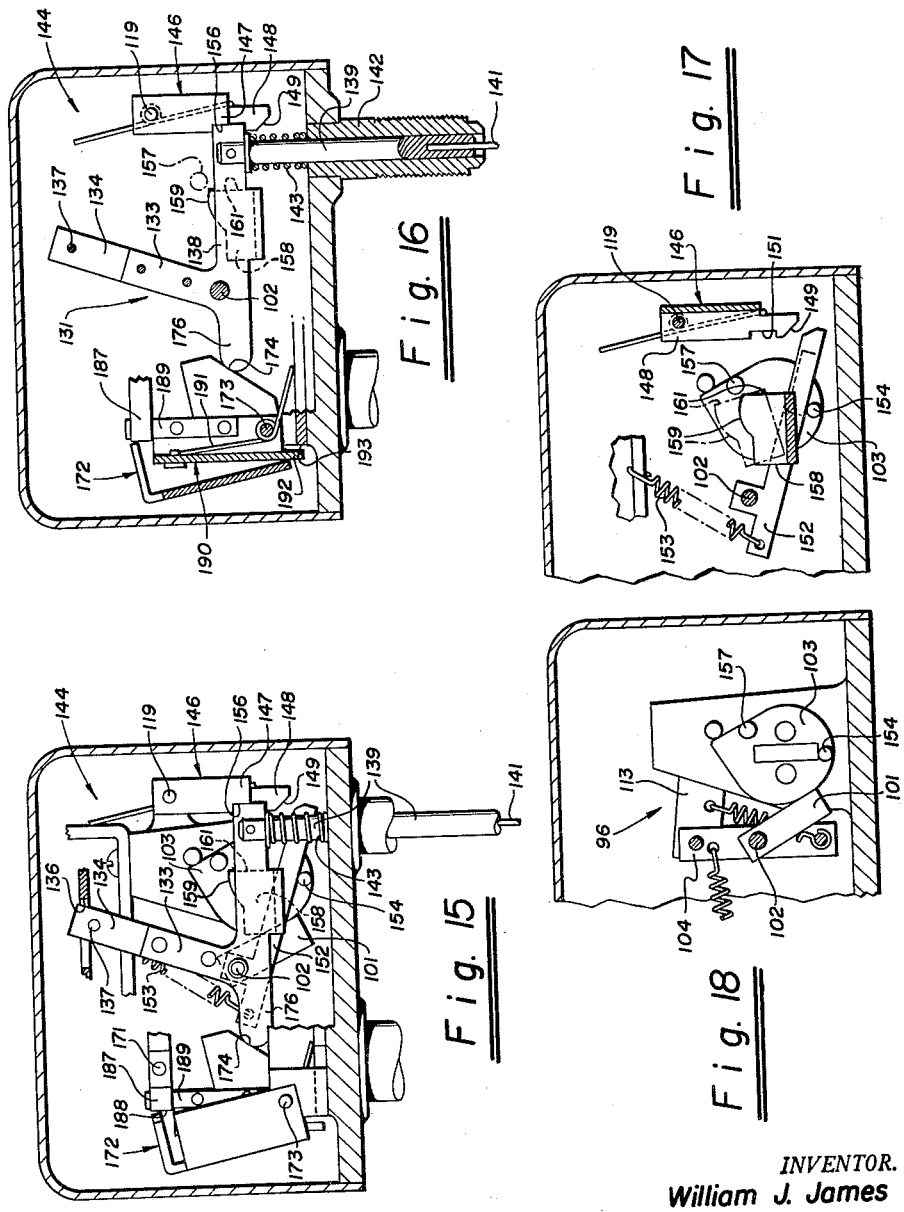
INVENTOR.
William J. James
BY Hubert E. Friend
Their Attorney

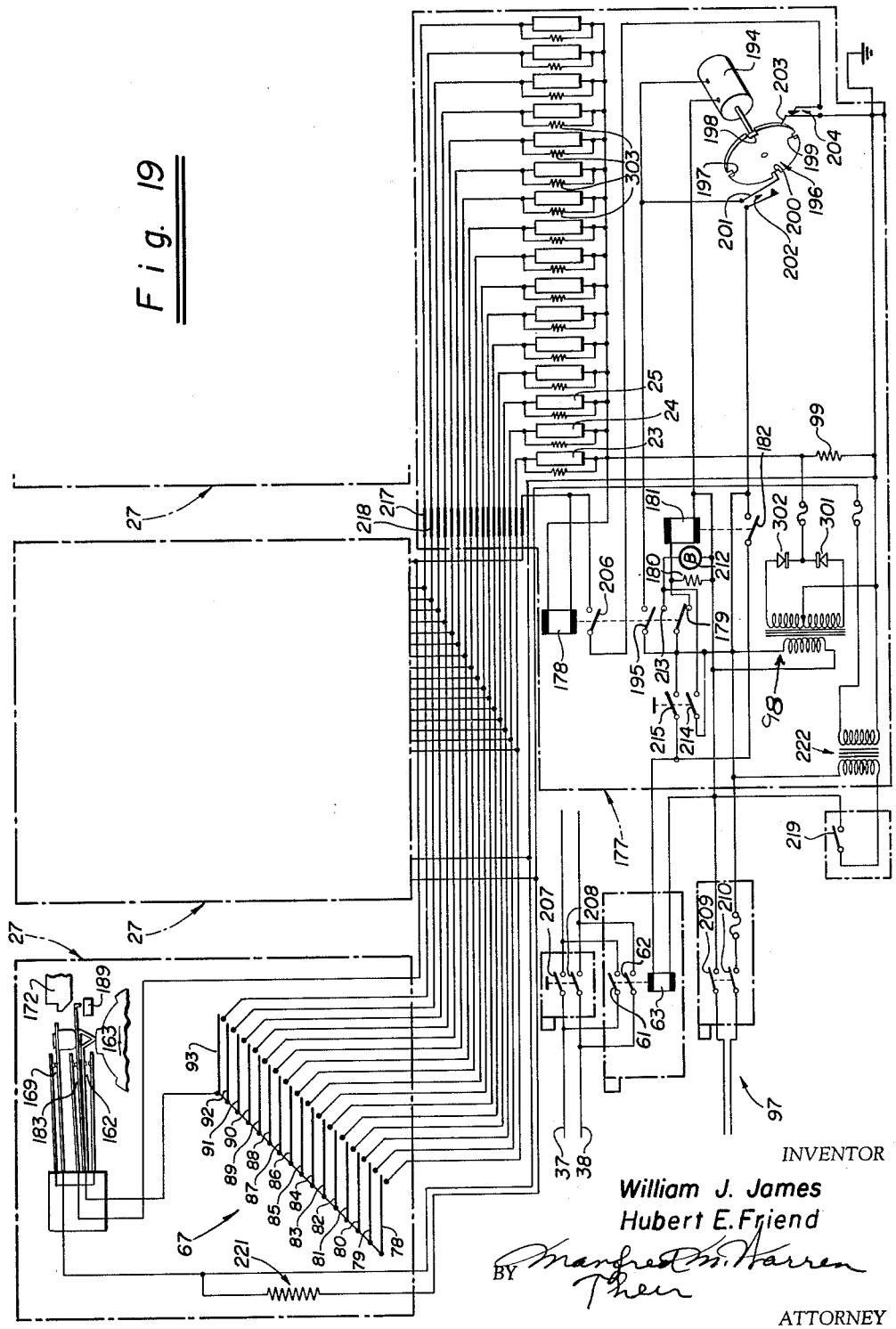

INVENTOR.
William J. James
Hubert E. Friend
BY
Their Attorney

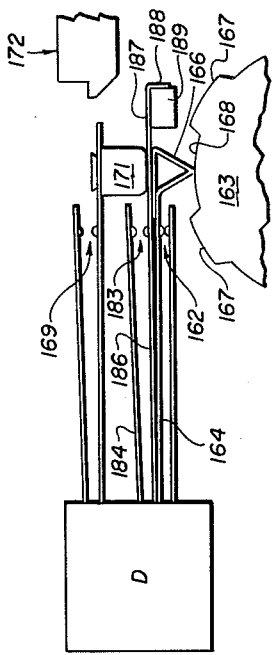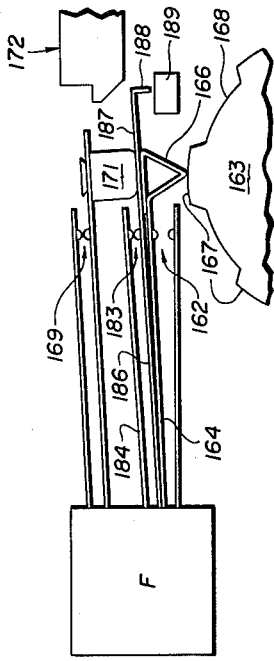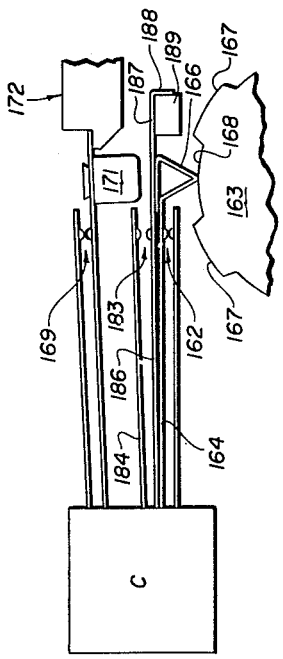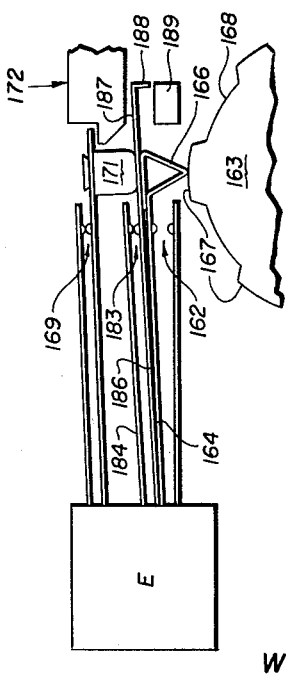

Sept. 18, 1962     W. J. JAMES ETAL     3,054,530
REGISTERING APPARATUS FOR FLUID DISPENSERS
Filed Nov. 30, 1959     9 Sheets-Sheet 9
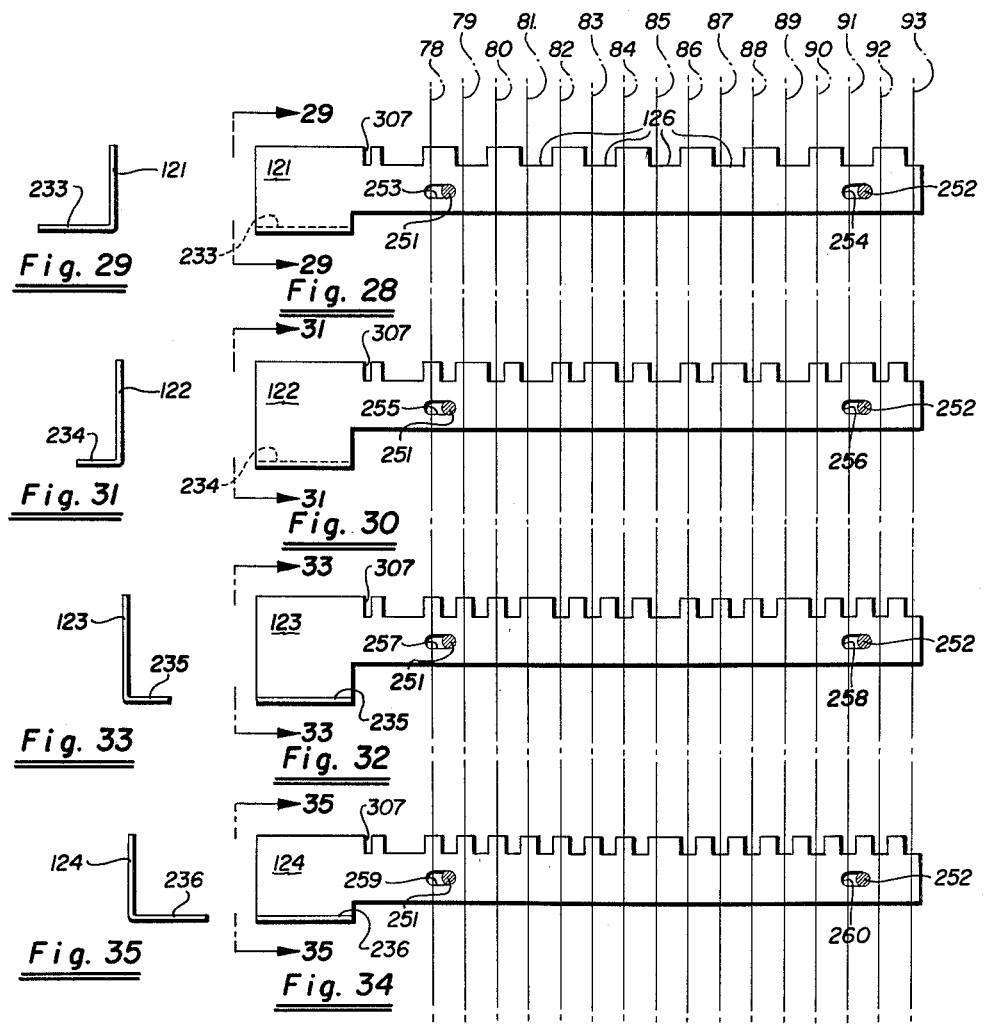
INVENTOR.
William J. James
Hubert E. Friend
BY
Their Attorney United States Patent Office 3,054,530
Patented Sept. 18, 1962

3,054,530
REGISTERING APPARATUS FOR
FLUID DISPENSERS
William J. James and Hubert E. Friend, Berkeley, Calif., assignors of sixty percent to William J. James, Berkeley, and forty percent to Maurice M. Toich, San Francisco, Calif.
Filed Nov. 30, 1959, Ser. No. 856,286
19 Claims. (Cl. 222—26)

This invention relates to registering apparatus for fluid dispensers operated by more than one operator, and particularly to apparatus distinguishing the operations of each operator from the operations of the others.

It is an object of the present invention to provide a registering apparatus for a fluid dispenser and arranged for foolproof and fraudproof recording of the dispensing operations of each operator to his own account and to no other, the apparatus being simple and compact in construction and being adaptable to existing fluid dispensers, the whole being designed to withstand heavy use and even abuse with minimum service and repair throughout a long and useful life.

It is another object of the present invention to provide a registering apparatus of the character described and particularly for use with a plurality of dispensers for centralized and even remote registering of the operations severally thereof and totalized for the individual operators, the apparatus being particularly adapted for use with dispensers of variegated fluids having different unit prices and providing records of the amounts dispensed and totalized in terms of money value for each individual operator.

It is a further object of the present invention to provide a registering apparatus of the character described and adapted for use with any number of dispensers operating concurrently and requiring unmistakable identifications of the several operators and precise recordings of the operations thereof under penalty for mis-operation, the apparatus being characterized by a high degree of locked security supplemented with alarm security operating upon violation or circumvention of the locked security.

The invention possesses other objects and features of advantage, some of which of the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings:

FIGURE 5 is a cross-sectional elevation view taken substantially on the plane of line 5—5 of FIGURE 4.

FIGURE 6 is a cross-sectional elevation view taken substantially on the plane of line 6—6 of FIGURE 4.

FIGURE 8 is a fragmented cross-sectional plan view taken substantially on the plane of line 8—8 of FIGURE 5.

FIGURE 10 is a fragmented cross-sectional elevation view of a portion of the apparatus taken substantially on the plane of line 10—10 of FIGURE 5.

FIGURE 12 is a fragmented cross-sectional elevation view, on an enlarged scale, of a portion of the apparatus enclosed by line 12—12 of FIGURE 10.

FIGURE 13 is a cross-sectional plan view of a portion of the apparatus taken substantially on the plane of line 13—13 of FIGURE 4.

FIGURE 14 is a fragmented cross-sectional plan view of a portion of the apparatus taken substantially on the plane of line 14—14 of FIGURE 4.

FIGURE 15 is a fragmented cross-sectional elevation view of a portion of the apparatus taken substantially along the plane of line 15—15 of FIGURE 14.

FIGURE 16 is a fragmented cross-sectional elevation view of a portion of the apparatus taken substantially on the plane of line 16—16 of FIGURE 14.

FIGURE 17 is a fragmented cross-sectional elevation view of a portion of the apparatus taken substantially along the plane of line 17—17 of FIGURE 14.

FIGURE 18 is a fragmented cross-sectional elevation view of a portion of the apparatus taken substantially on the plane of line 18—18 of FIGURE 14.

FIGURE 19 is a schematic circuit diagram of an electrical circuit for a registering apparatus for fluid dispensers constructed in accordance with the invention.

FIGURE 24 is an alternative view showing the apparatus of FIGURE 20 in another position.

FIGURE 25 is an alternative view showing the apparatus of FIGURE 20 in another position.

FIGURE 26 is an alternative view showing the apparatus of FIGURE 20 in another position.

FIGURE 27 is an alternative view showing the apparatus of FIGURE 20 in another position.

FIGURE 28 is an elevation view on an enlarged scale of a portion of the apparatus shown in FIGURE 11.

FIGURE 29 is an end view of the apparatus shown in FIGURE 28, taken along the plane of line 29—29 thereof.

FIGURE 30 is an elevation view on an enlarged scale of another portion of the apparatus shown in FIGURE 11.

FIGURE 31 is an end view of the apparatus shown in FIGURE 30, taken along the plane of line 31—31 thereof.

FIGURE 32 is an elevation view on an enlarged scale of another portion of the apparatus shown in FIGURE 11.

FIGURE 33 is an end view of the apparatus shown in FIGURE 32, taken along the plane of line 33—33 thereof.

FIGURE 34 is an elevation view on an enlarged scale of another portion of the apparatus shown in FIGURE 11.

FIGURE 35 is an end view of the apparatus shown in FIGURE 34, taken along the plane of line 35—35 thereof.

Figure 1:
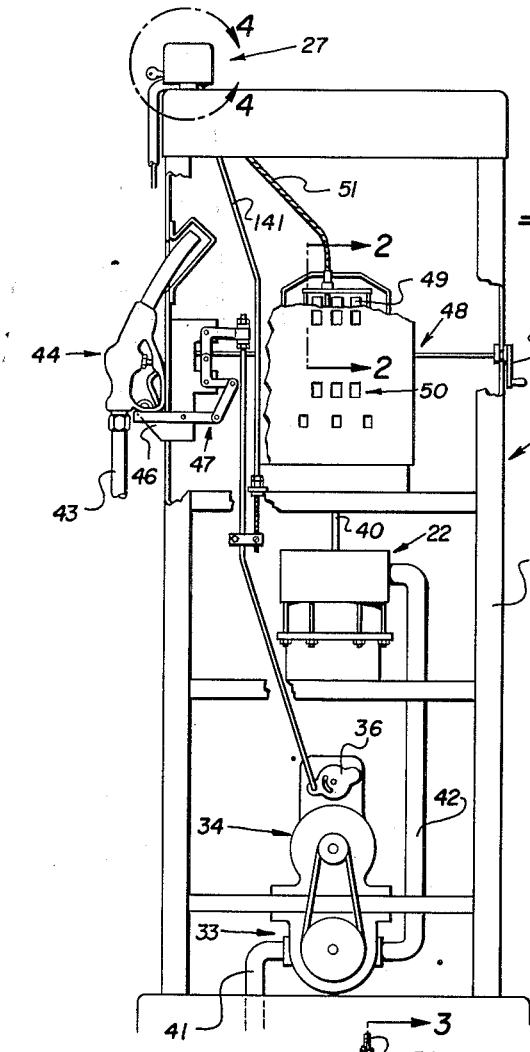
FIGURE 1 is a broken-away front elevation view of a portion of a registering apparatus for fluid dispensers constructed in accordance with the present invention and applied to one typical form of gasoline dispenser.

The registering apparatus for fluid dispensers of the present invention is designed to be used in one form with a plurality of dispensers 21 (FIGURE 1) used by a plurality of attendants and each dispenser including a meter 22 associated therewith and sensing the quantity of fluid dispensed thereby. The registering apparatus consists briefly of a plurality of registers 23, 24, 25, etc. (FIGURE 19), assigned one to each attendant, a plurality of selector mechanisms 27 (FIGURES 1 and 19) connected one to each of the meters 22 and each selector mechanism being disposed for selective connection to any of the registers for registering the sensing of the meter thereon, each of the selector mechanisms including identification means 31 (FIGURES 5 and 19) manually operable by and selectively responsive to each attendant to connect the associated meter to his own register. Thus whenever an attendant desires to operate any dispenser he first manually operates the identification means 31 which permits the selector mechanisms to connect the meter 22 to that one of the registers 23—25 etc., that is assigned to the particular attendant, and when the dispenser is operated and the meter 22 senses the quantity of fluid dispensed, then the total is automatically recorded on the register pertaining to the individual operator.

The invention may be applied to gasoline dispensing systems of any type, including those having a central pump and dispersed dispensers each equipped with a dispensing hose and nozzle, but as here illustrated, the invention is applied to a system in which each dispenser 21 (FIGURE 1) normally comprises a metallic frame 32 in which is mounted a gasoline pump 33 and a pump driving motor 34 (usually electric) actuated by a motor turn-on switch 36. The electric motor 34 is connected to a power source (not shown) by means of power lines 37 and 38 (FIGURE 19). The pump 33 (FIGURE 1) has an inlet conduit 41 leading from a gasoline storage tank (not shown), and an outlet conduit 42 leading through the meter 22 and to a dispensing hose 43 having a hand-operated nozzle 44. Usually the nozzle 44 is kept at rest upon a nozzle cradle 46 which is connected as by a linkage 47 to the operating switch 36 of the pump motor 34, so that when the nozzle 44 is in position on the cradle 46 the motor 34 is automatically turned off, and when the nozzle 44 is lifted from the cradle 46 the operating switch 36 of the motor may be turned on by raising the cradle, and the motor 34 operates the pump 33 to pump the gasoline through the hose and nozzle. The nozzle 44 is also adapted to be locked as with a padlock to the cradle 46 in such a way that the nozzle cannot be lifted off nor the cradle moved to operate the pump motor 34 when the filling station is locked up for the night.

Figure 3:
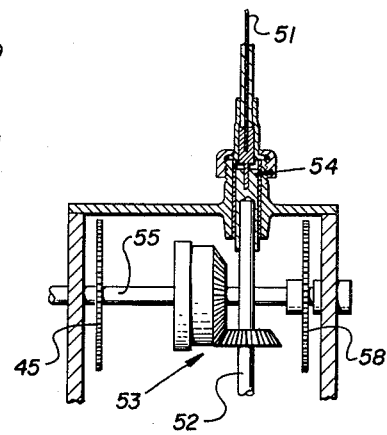
FIGURE 3 is a side view of the apparatus shown in FIGURE 2, and is taken substantially on the plane of line 3—3 of FIGURE 2.
Figure 2:
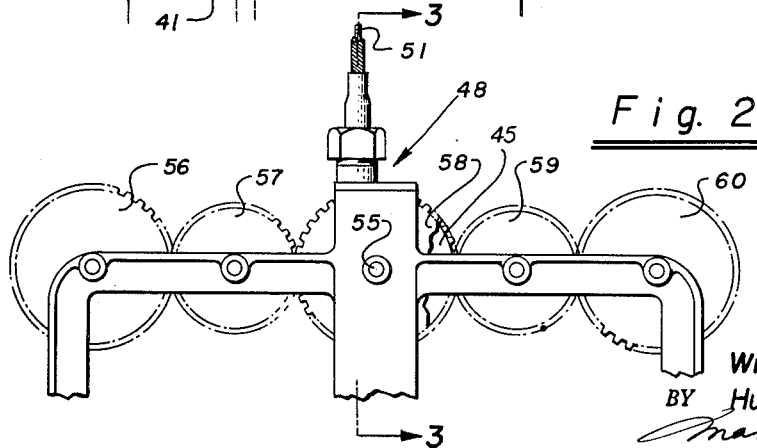
FIGURE 2 is a fragmented elevation view, on an enlarged scale, of a portion of the gasoline dispenser shown in FIGURE 1, with a portion of the registering apparatus of the invention applied thereto, the view being taken substantially on the plane of line 2—2 of FIGURE 1.

The meter 22 has a display apparatus 48, commonly called a computor, associated with it for displaying a running total of the quantity (in gallons) of gasoline dispensed, as by indicator dials 50, which are connected to the meter through appropriate gearing and through the rotating shaft 40. Also in the computor 48 is a set of gearing (not shown) running from shaft 40 and adjustable to correspond with the price per gallon of the gasoline being dispensed, and a shaft 52 runs from these gears to a set of money wheels 49 for displaying a running total of the amount of the sale in dollars and cents. There are two sets of money wheels 49 mounted for display on opposite sides of the dispenser. One set is driven by gears 56, 57 and 59 (FIGURES 2 and 3) from the shaft 52, and the other set is driven by gears 45, 59 and 60 from the same shaft 52. A reset crank 309 is provided and is interlocked with the linkage 47 so that the pump motor may not be turned on for a subsequent operation until the money wheels have been reset to zero. The shaft 52, rotating as a function of the money value of gasoline dispensed, continues upward and is connected through a fitting 54 to a flexle rotating shaft 51, which is in turn connected to the selector mechanism. Of course the rotation of the shaft 51 is a function of both the quantity and the value of the gasoline dispensed, but the apparatus is particularly arranged for directly registering the money value on the register to which the selector mechanism is connected. Thus when a station has a plurality of dispensers for different fluids, or for fluids having different prices, the computors are set to convert the actual quantities dispensed in unit volume output to preset monetary values, and the varying outputs of the dispensers are converted to a common monetary denomination for accumulative registering on the registers, with the result that a single attendant may dispense all types of fluids and the value is directly accumulated without the need for item notation or later computation.

For simplicity and clarity, the electrical circuit wiring is not shown in the mechanical drawing figures, but is shown entire in FIGURE 19. As particularly shown in FIGURE 19 the power lines 37 and 38 include switches 61 and 62, which are normally open but which are held closed upon energization of a relay 63; and the identification means 31 and the selector mechanism 27 are connected to the relay 63 to co-function and to control the operation of the relay 63 and its associated switches 61 and 62, the power lines 37 and 38, and the pump motor 34. The circuit may also be connected to close individual electrically operated flow-control valves at the affected dispenser. Thus the identification means 31 co-functions with the selector mechanism 27 to control the fluid flow of the dispenser 21. This arrangement is useful for preventing improper operation of the dispenser 21 by persons (including authorized attendants) who do not properly identify themselves on the identification means 31.

Figure 11:
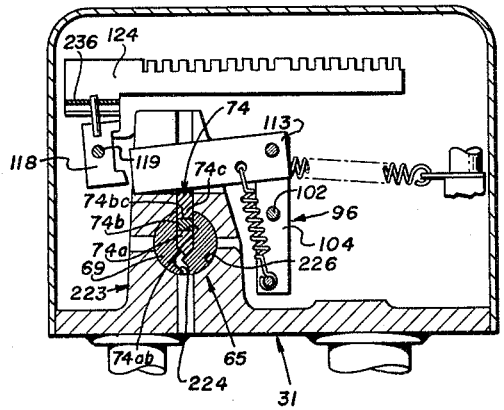
FIGURE 11 is a fragmented cross-sectional elevation view of a portion of the apparatus taken substantially on the plane of line 11—11 of FIGURE 10.
Figure 9:
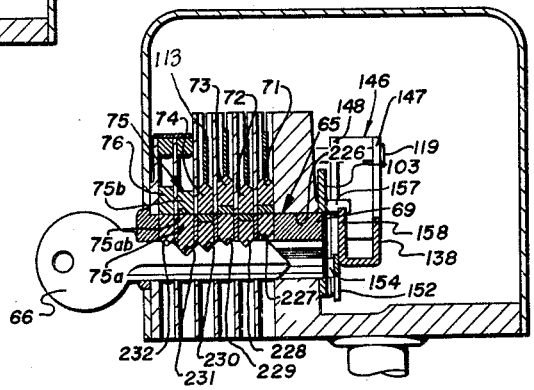
FIGURE 9 is a fragmented cross-sectional elevation view of a portion of the apparatus taken substantially on the plane of line 9—9 of FIGURE 5, and showing one of the keys in place.

As particularly shown in FIGURES 5, 9 and 11 the selector mechanism 27 and identification means 31 includes a lock 65 and a family of related keys, such as the key 66, the keys being similar in that they may all operate the lock 65, but each key being different from the others in being adapted to co-function with the lock 65 and the selector means 27 to connect the meter 22 with a different one of the registers 23—25, etc.; and each of the keys is issued to a different attendant to enable him to connect the meter only to a particular one of the registers which is assigned to him to keep his own particular account.

Each of the keys 66 etc., additionally co-functions with the lock 65 to effect the above-defined fluid flow control of the dispenser 21, so that if none of the keys 66 etc. is used to operate the lock 65, then upon any attempt to dispense, as when the pump motor 34 is turned on, and the first spurt of fluid flow is sensed by meter 22, the relay 63 is automatically de-energized, the switches 61 and 62 are automatically opened and power to the dispenser is cut off.

The connection from meter 22 through selector mechanism 27 to the register may be a directly-operating connection as provided by a rotating shaft or a selsyn motor, but as shown in FIGURES 8, 13 and 19 the illustrated apparatus particularly includes a signal transmitter 67 (one for each dispenser 21, etc.) connected to the meter 22 and emitting a signal as a function of the quantity of gasoline being dispensed, and particularly the quantity in terms of money value, and each of the keys 66 etc., co-functions with the lock 65 and selector mechanism 27 to connect the associated transmitter with the particular register 23—25 etc., representing the individual holder of the key. Of course when more than one dispenser is being used each signal transmitter 67 etc., is connected to the meter of its particular dispenser, and functions in cooperation with the particular lock of the associated selector mechanism, but still in response to any of the keys 66 etc.

As previously described when the meter of the dispenser being used has a rotating indicator (computor) to which the selector mechanism 27 is to be connected, then it is particularly the transmitter 67 that is coupled to the rotating indicator; and in a preferred form of the invention the transmitter 67 comprises an electric current pulsing means 68 coupled to the rotating indicator as by the flexible cable 51, the pulsing means 68 having an output pulse varying as a function of the rotation of the computor money indicator wheels, and the registers 23—25 etc., being electrically-operated registers responsive to the current from the pulsing means 68 for cumulatively registering the number of pulses received. Registers of this class are well known in the art.

As shown in FIGURES 5, 8, 9, 11 and 19 the preferred form of the invention has a particular structure enabling the keys 66 etc., the lock 65, and the selector mechanism 27 to control the above-described connection between the transmitter 67 and a particular one of the registers 23—25 etc. The lock 65 (FIGURES 5, 9 and 11) has a rotor 69 and a plurality of tumbler pins 71, 72, 73, 74, 75 and 76 normally restraining the movement of the rotor 69 and being variously responsive to the keys 66 etc., to release the rotor 69 for rotation. There is also provided a plurality of electric identification switches 78, 79, 80, 81, 82, 83, 84, 85, 86, 87, 88, 89, 90, 91, 92 and 93 (FIGURES 8 and 19), one for each key (there being in the illustrated example sixteen identification switches and sixteen corresponding keys); and a means 96 (FIGURES 11, 18 and 10) connected to the rotor 69 and actuated upon rotation thereof and co-functioning with the pins (in this example the pins 71—74) to effect selection of the one particular identification switch 78—93 corresponding to the employed key 66, etc., for operation of the switch in connecting the transmitter 67 to the corresponding register 23—25, etc. In effect each of the pins 71—74 is raised by the key to either one of two positions, so as to provide sixteen different possible arrays for the pins, and in each array the co-functioning means 96 is arranged to permit the operation of one of the switches 78—93 and to block the operation of all the others. As particularly shown in FIGURE 19 each of the switches 78—93 is connected to a different one of the registers 23—25, etc., and each of the switches 78—93 is connected to the transmitter 67, which is grounded whenever the circuit through the transmitter is closed as during the making of the current pulse; and each of the registers 23—25 etc., is connected to a power source 97, so that whenever one of the switches 78—93 is closed the transmitter 67 is enabled to make a power transmitting circuit during its pulsing phase from ground through the particular switch 78—93 and its corresponding register 23—25 etc., to the power source 97, and an electrical direct-current pulse flows through the selected register. In the illustrated embodiment (FIGURE 19) the power source 97 is an alternating current source and the actual connection between this source and the registers 23—25 etc., is made through a rectifier and transformer unit 98, having diodes 301 and 302 connected in parallel to both ends of the transformer secondary coil and leading to the direct-current output line and the registers. Each of the diodes passes output current and blocks reverse current to the transformer. The output line is grounded as through a voltage stabilizing resistor 99, the circuit values being chosen in this example for producing a voltage in the power pulse of approximately twenty-four volts direct current. Each register 23—25 etc. is connected in parallel with a spark-suppression resistor 303. As shown in FIGURES 18 and 10 the rotor actuated means 96 comprises a cam follower bar 101 mounted for rotation on a journaled shaft 102 and actuated for rotating the shaft 102 by a suitably shaped cam 103 affixed to one end of the rotor 69 so that the shaft 102 is rotated upon rotation of the rotor. Also provided is a spring-loaded rocking bracket 104 affixed to the shaft 102 for rotation therewith and having pinned for rotation and translation at one side thereof four pusher bars 110, 111, 112, 113, each of which bears against an end of a different one of the pins 71—74 (FIGURE 11) and is spring-loaded in connection with the bracket 104 to remain in bearing relation against the corresponding pin. Thus when the pins are raised by the key to either of their two positions the associated pusher bars 110—113 are similarly raised and upon rotation of the key and rotor, the pusher bars 110—113 are translated to slide transversely of the pins and to bear against one end or the other of four corresponding secondary rocker arms 115, 116, 117 and 118 (FIGURES 7 and 11) which are mounted for rotation on a shaft 119. If the pusher bar is in its lower position as shown in FIGURE 9, then the corresponding rocker arm 118 (FIGURE 11) will be rotated in a clock-wise direction, and if the pusher bar 113 is in its uppermost pin raised position then the rocker arm 118 will be rotated in a counter-clockwise direction. Each rocker arm 115—118 has a projection extending from one end and engaging one of four code plates 121, 122, 123 and 124 (FIGURES 7 and 11; also see FIGURES 28-34) for translating the corresponding code plate to one of two positions depending upon whether the rocker arm 115—118 has been moved clock-wise or counter clockwise. Thus for each of the two positions for each pin there is a corresponding position for the associated code plate 121—124, and each of the code plates has a series of notches 126, etc., formed in a side facing the leaves of the switches 78—93, there being sixteen different arrays of these notches 126, etc., according to the manner in which the code plates are arranged in their first and second positions, and in each of the sixteen different arrays of notches (see especially FIGURE 12 and FIGURES 28-34) the notches are so arranged that one and only one notch from each plate coincides precisely with one and only one notch from each of the other plates just opposite one of the switches 78—93, so as to permit that particular switch to be closed; and in each of the sixteen different arrays of notches it is a different one of the switches 78—93 that is selected for closing.

It will be noted (FIGURE 11) that the actuating connection between the pusher bars 110—113 and the rocker arms 115—118 is a lost motion connection, and the play of the elements is so adjusted that the setting of the code plates 121—124 in their new selecting positions is completed only upon full progressive rotation of the rotor 69; and the rotor 69 may subsequently be returned on regressive rotation to its original position as for withdrawal of the key 66 etc., without disturbing the set positions of the code plates 121—124. As shown in FIGURES 8 and 12, each of the operating leaves of the switches 78—93 is mounted upon a rocking plate 127, the switch leaves being formed as flexible wires in the general form of a brush extending from the plate 127 so that when the plate 127 is rotated all of the switch leaves are rotated together toward their closed positions but are stopped and flexed (that is all but one) by the code plates 121—124; and the ends of the switches are connected as by suitable electrical leads to a switch terminal post 128 (FIGURES 5 and 8) for connection to the respective registers 23—25 etc., as shown in FIGURE 19. The rocking plate 127 is mounted on a fixed shaft 129 (FIGURES 8-12) which is pivoted from suitable base supports in the apparatus and the plate is spring-loaded to tend to remain in switch open position. A switch closing means 131 (FIGURES 16, 15, 6, 8 and 12) is also provided in the form of a T-bar, pivoted at the intersection of its arms as by the fixed shaft 102, and having one arm 133 with an electrically insulating tip 134 arranged to project through a slot 136 in the rocking plate 127, the insulating tip 134 having a transverse projection 137 disposed bearing against the bottom of the rocking plate 127, so that when the T-bar 131 is rotated the rocking plate 127 is forced toward switch closing position. As shown in FIGURE 16, another arm 138 of the T-bar 131 is connected as by a spring-loaded pin 139 to a tension wire 141, which is arranged to be pulled for resetting the T-bar 131 to its switch-opening position at the end of a dispensing operation. The tension wire 141 may be arranged to be pulled by hand, but for convenience and for automatic operation is here shown as connected to the linkage 47 (see FIGURE 1) for the operating switch 36 of the pump motor 34, so that whenever the pump motor (flow control means) is turned on (i.e., from no-flow to flow position), the pin 139 is freed for translation to rotate the T-bar to its switch closing position; and whenever the pump motor 34 is turned off (i.e., from flow to no-flow position) the tension wire 141 is placed under tension, pulling the pin 139 downward and rotating the T-bar 131 to its switch-opening position. The connection between pin 139 and arm 138 is here illustrated as made with a transverse pin riding in an enlarged or slotted hole in arm 138, to provide for operation without binding. The pin 139 is mounted for sliding movement in a mount 142 affixed to a portion of the selector mechanism 27 chassis, and is spring-loaded as by a spring 143 urging the pin 139 and T-bar 131 toward switch closing position. Thus the switch closing means is connected to the flow control means of the dispenser and is actuated by the flow control means to close the selected identification switch upon movement of the flow control means to flow position. However in order to prevent more than one operation of the switches for each application of an identifying key 66 etc., that is, to prevent an unauthorized person from following an authorized operator to the dispenser and making a second dispensing operation using the identification and register of the previous authorized operator, there is provided a means 144 connected to and co-functioning with the regressive movement of the rotor 69 and functioning on movement of the flow control means to its no-flow position to prevent a subsequent operation of the switch closing means 131 except upon a subsequent full progressive rotation of the rotor 69. This means 144 comprises a spring-loaded detent element 146 (FIGURES 15, 16) mounted as for rotation on the fixed shaft 119 and having a detent portion 147 normally interposed in the switch closing path of the arm 138 of the T-bar 131, so that the switch closing means cannot be operated unless this detent element 146 is removed from the path of the T-bar. Particularly, the tip of the arm 138 is retained in a notch 156 formed in the portion 147. The detent element 146 has another portion 148 (FIGURE 17) on which is formed a cam surface 149 and a notch 151. A separate arm 152 spring-loaded as by spring 153 and pivoted from the shaft 102, is disposed to bear against the cam surface 149 of the detent element 146 and to move the detent element 146 into T-bar freeing position (the arm 138 freed from notch 156) upon rotation of the arm 152, the tip of the arm 152 being arranged to slip into the notch 151 so that the arm 152 is temporarily retained in the T-bar freeing position when the rotation of the arm 152 has proceeded sufficiently far. A cam lug 154 is formed on the rotor 69 and arranged to bear against the arm 152 for rotation thereof upon rotation of the rotor 69. Thus in order to free the T-bar 131 for rotation to switch closing position it is first absolutely essential to rotate the rotor 69 as by one of the keys 66 etc., moving the arm 152 and the detent element 146 from the path of the T-bar. However as shown in FIGURE 16, the arm 138 of the T-bar after passing from the notch 156 and in its movement to switch closing position bears against the now slanted left-hand side (FIGURE 16) of the detent element 146, moving the detent element (counter-clockwise) to a further position freeing the tip of the arm 152 from the notch 151, and the arm under the urging of its spring 153 is freed to fly back to its original position (providing that the rotor and its lug 154 has been returned to its original position, as will be later seen). Thus the detent element is freed for re-interpositioning in the progressive path of the T-bar 131 (when the latter is returned to switch-opening position) and is only held in its non-detenting position by the T-bar itself so long as the T-bar is maintained in its switch closing position. Once the pump and the motor has been turned off and the T-bar returned to its switch open position the detent element 146 is automatically re-interposed in the progressive path of the T-bar and the switches 78—93 cannot be closed again until one of the keys 66 etc., is employed in a new cycle to rotate the rotor 69.

In order to provide a single fixed sequence for the operation of the apparatus, thus to obviate confusion of the attendant and avoid possible misoperation, it is desirable to assure that the lug 154 of the rotor 69 is removed out of the way of the return movement of the arm 152 before the T-bar is moved to its switch closing position. Accordingly there is formed a second lug 157 on the cam 103 of rotor 69 (FIGURES 16 and 17), and an extension 158 is formed on the arm 138 of the T-bar, the extension having a cam surface 159 formed thereon against which the lug 157 comes into contact as soon as it begins its rotation, so that the T-bar is prevented from rotating toward its switch closing position whenever the rotor 69 is not in its initial position; and in effect whenever the key 66 etc., is used to set the identification on the code plates 121—124, the key and rotor 69 must then be rotated retrogressively to their initial positions before the T-bar can be actuated as by the turning on of the pump motor 34. The cam surface 159 is also adapted to bear firmly against the lug 157 at the extreme limit of progressive rotation of the rotor 69, thus preventing physical damage to the apparatus. The extension 158 of the T-bar has a second surface 161 arranged to be interposed in the progressive path of the lug 157 at all times after the T-bar has begun its progressive movement toward the switch closing position, in order to prevent accidental or deliberate rotation of the rotor 69 as by employment of a different key 66 etc. during the course of a dispensing operation. Thus a second key can be turned progressively in a forward direction only after the dispenser has been returned to a "pump motor off" position as shown in FIGURE 16, because if the pump motor were still "on," T-bar 131 would still be in its counter-clockwise rotated position with cam surface 161 in blocking position against counter-clockwise movement of lug 157 and preventing rotation of the lock. On the other hand, T-bar 131 cannot be rotated counter-clockwise while the key is being turned, because lug 157 has been rotated to a blocking position above cam surface 159. In conjunction with detent element 146, this arrangement forces the operator to insert his key and turn it fully forward, then retrogressively all the way back to beginning position before he can pump without getting an "alarm" (as will be explained hereinafter, an "alarm" condition will occur whenever liquid is pumped with the T-bar in switch-open position).

As particularly shown in FIGURES 19, 13, 4 and 8 the transmitter 67 includes a make-and-break pulsing switch 162 connected in series with each of the identification switches 78—93 and their corresponding registers 23—25 etc.; and a rotating cam 163 connected to the meter 22 as by the flexible rotating cable 51 for rotation of the cam 163 upon actuation of the meter. One leaf 164 (FIGURE 13) of the switch 162 is spring-loaded and has a cam follower 166 formed thereon and bearing against cam 163; and the cam 163 has a series of raised portions 167 and lowered portions 168 alternatingly formed on the cam surface thereof for bearing against the cam follower 166 and intermittently opening and closing the switch 162 upon rotation of the cam 163. Each time the pulsing switch 162 is closed a complete current pulsing circuit is formed to one of the registers 23—25 etc. (except as hereinafter noted), and each time the switch 162 is opened, the end of a pulse is signaled, so that continuous rotation of the cam 163 in response to flow of gasoline through the meter 22 results in the production of a series of electrical pulses, the number of which corresponds with the quantity of gasoline dispensed.

Figure 20:
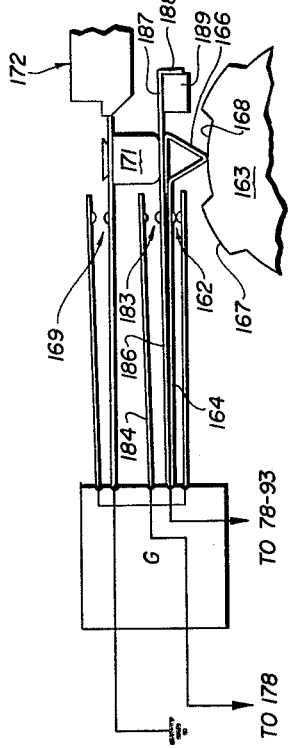
FIGURE 20 is a fragmented plan view on an enlarged scale of a portion of the apparatus shown in FIGURE 13, and also including a portion of the electrical circuit shown in FIGURE 19, schematically rendered.
Figure 21:
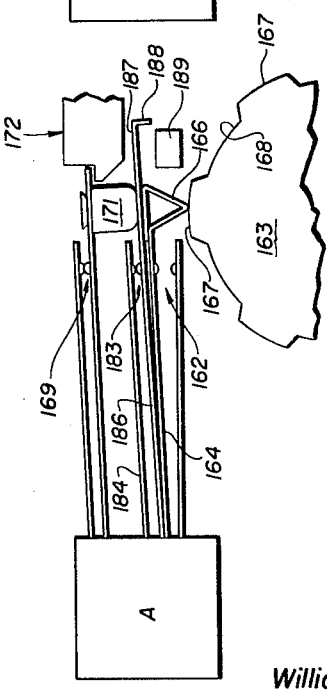
FIGURE 21 is an alternative view showing the apparatus of FIGURE 20 in another position.

With the pulsing arrangement above described there is one possible difficulty in that whenever the cam stops rotating with the cam follower 166 resting in one of the lowered portions 168 of the cam, so that the switch 162 is closed in pulsing position, then the breaking of the pulsing circuit as by turning off the motor 34 at the end of a dispensing operation (thus opening the identification switch 78—93 through tension wire 141 and T-bar 131) results in signalling the end of a pulse to the recording register 23—25 etc. (see FIGURE 20). This is very well but it will be seen that upon the beginning of a new dispensing operation and the reclosing of the pulsing circuit as by turning the pump of the motor 34 on and closing one of the switches 78—93 a second pulse will be signalled to one of the registers for the same position of the cam 163 which has already corresponded with the sending of a pulse to a register (as in the previous dispensing operation); and thus two pulses would be totalled up on the registers for the day's operations where only one pulse was intended. If each pulse corresponds to a sale of one penny's worth of gasoline, then at the end of the day the total sales would be in error by a figure—in cents—equal to approximately one-half the total number of dispensing operations, there being a statistical probability of 0.50 that any dispensing operation will terminate with the circuit in the "pulse making" position. Therefore it is important to ensure that whenever a dispensing operation stops in the middle of a pulse, the subsequent dispensing operation must result in eliminating the very first pulse that would otherwise be transmitted by the transmitter 67 and transmission must be delayed until the cam 163 has rotated to a position with the cam follower 166 bearing in the next subsequently following lowered portion 168. Accordingly there is provided an actuating switch 169 (FIGURES 13, 19 and 20) connected in series with the pulsing switch 162 and the identification switches 78—93 and connected to the rotating cam 163 as by an insulating spacer 171, which bears at least indirectly against the cam follower 166 for opening the actuating switch 169 when the pulsing switch 162 is closed and closing the actuating switch when the pulsing switch is open, so that ordinarily the pulsing circuit would never be completed even when the pulsing switch is closed unless some special action were taken to hold the actuating switch 169 in closed position after it has first arrived in such closed position; and upon initial rotation of the cam 163, beginning with the cam follower 166 in one of the lowered portions 168 no signal is transmitted until the cam follower has risen up and over the next following raised portion 167 and has begun its descent into the next following lowered portion 168, and the very first pulse of the pulsing cycle is eliminated. In order to maintain the actuating switch 169 in its closed position once it has been closed, there is provided an actuating switch detent element 172 (FIGURES 20, 13 and 16), forming a connection between the actuating switch 169 and the switch closing means 131, so that the switch closing means 131 must be in its identification-switch-closing position in order to dispose the detent element 172 in the switch opening path of the switch 169, as shown in sequence in FIGURES 20, 21 and 22; and thus whenever the switch closing means 131 is properly operated as by the train of events previously described the detent element 172 is disposed to hold the actuating switch 169 closed after the first pulse has been eliminated and a false transmission of two pulses for a single pennyworth of fluid thus avoided. Of course if the cam 163 has stopped in a position with the pulsing switch 162 open and the actuating switch 169 closed, (FIGURE 25) then upon the beginning of the new dispensing operation, the turning on of the pump motor 34 and the rotation of the switch closing means 131 automatically positions the detent element 172 in switch closing position immediately (sequence: FIGURES 25 and 21) and the first pulse from the transmitter is counted as it very well should be. The structural details of the detent element 172 are as follows: (FIGURES 13, 15 and 16) the detent element 172 is pivoted on a fixed shaft 173 and has a cam surface 174 formed thereon for bearing against a third arm 176 of the T-bar 131, and the detent element 172 is spring-loaded to intrude into the path of the actuating switch 169 except when it is held out of that path by action of the T-bar 131 in its identification-switch-opening position, and whenever the T-bar is moved to switch closing position the detent element 172 is permitted to move toward its detenting position with the switch 169, and will hold the switch 169 closed whenever it has been closed as by action of the rotating cam 163.

As previously described the identification means 31 including the lock 65 and the keys 66 etc., which is part of the selector mechanism, is arranged to co-function with the entire selector mechanism to control the fluid flow of the dispenser 21, particularly for interrupting the fluid flow of the dispenser whenever an attempt has been made to dispense without prior use of one of the keys to identify the operator. Referring now to FIGURE 19 there is shown a master gasoline flow-control means 177 (connected to the dispenser 21) and having "flow" and "no-flow" positions and being responsive to any of the electric pulses from the transmitter 67 to assume the no-flow position at least for the duration of the pulse. The master flow control means 177 includes a master control relay 178 controlling a normally-closed switch 179, so as to open the switch 179 when the relay 178 is energized. Switch 179 is connected in series with a parallel-connected relay 181 and resistor 180, and this assembly is connected directly across the lead lines from the power source 97, so that relay 181 is energized whenever relay 178 is not energized. The relay 181 controls a normally-open switch 182 so as to close the switch 182 whenever the relay 181 is energized. Switch 182 and relay 63 are connected in series across the lead lines from the power source 97. It has already been noted that the relay 63 when energized holds the switches 61 and 62 closed, permitting delivery of power to the dispenser 21. Thus the master flow control means 177 has flow and no-flow conditions, the flow condition being brought about when the relay 178 is not energized, so that switch 179 is closed and relay 181 is energized, holding switch 182 closed and energizing relay 63, which in turn holds switches 61 and 62 closed providing power to the dispenser 21 through the leads 37 and 38; and the no-flow condition being when relay 178 is energized, which condition eventuates through the same chain of circuit elements to open the switches 61 and 62 and interrupt the power to the dispenser 21. The relay 178 is also connected to the transmitter 67 to be energized by power pulses from the transmitter whenever an attempt to dispense is made without a preliminary use of the identification means 31. Specifically the relay 178 is connected in series with the output of power unit 98 and with a mis-operation-responsive switch 183 (FIGURES 19, 13 and 20), which is connected to the pulsing switch 162 in parallel with the identification switches 78—93, so that whenever the mis-operation-responsive switch 183, the pulsing switch 162, and the actuating switch 169 (which is connected to electrical ground) and all three closed at the same time a power pulse circuit is completed from ground to switch 169, the switch 162, the switch 183, the relay 178, the rectifier diodes 301 and 302 and the power transformer 98, resulting in interruption of power to the dispenser 21. The apparatus is also arranged so that this described circuit tends to eventuate only when all of the identification switches 78—93 are open, so no pulse can be concurrently transmitted to any of the registers 23—25, etc.

Actually, the detent 172 is mechanically sequenced to move out of its detenting position before the switches 78—93 are opened and to move into detenting position after the switches 78—93 are closed, so as to prevent the occurrence of any condition in which the dispenser can be operated without registering or alarming, one or the other.

Figure 22:
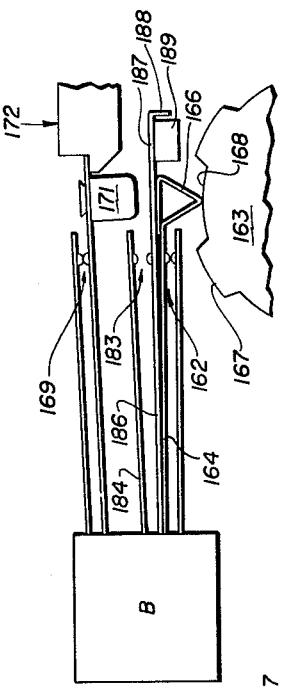
FIGURE 22 is an alternative view showing the apparatus of FIGURE 20 in another position.

Referring now to FIGURES 13, 22 and 21, there is shown how the mis-operation-responsive switch 183 is arranged to be ordinarily open when the pulsing switch 162 is closed (FIGURE 22), and closed when the pulsing switch 162 is open (FIGURE 21), so that under ordinary (proper) circumstances no actuation of the master flow control means 177 (i.e., no energization of relay 178) is effected. In particular, the mis-operation-responsive switch 183 is composed of a springy contact leaf 184 and a springy operating leaf 186, spring-loaded toward "open" position; the operating leaf spring 186 being electrically connected to the operating leaf 164 of pulsing switch 162, and the contact leaf 184 of the mis-operation-responsive switch 183 being electrically connected to relay 178. The operating leaf 186 is also connected to the cam 163, as by being positioned overlying the operating leaf 164 of the pulsing switch and its cam follower 166, so as to be intermittently urged to open and closed position by action of the cam follower 166. The operating leaf 186 of the mis-operation-responsive switch 183 is particularly inserted between cam follower 166 and the insulating spacer 171 of the actuating switch 169 whenever the actuating switch 169 is used in the combination, so as to make certain that the actuating switch 169 is closed to make the required ground-connection whenever the mis-operation-responsive switch 183 is closed, including such times (FIGURE 23) as when the cam follower 163 is on one of the lowered portions 168 of the cam 163 and the detent element 172 is withdrawn from its detenting position (all of the identification switches 78—93 being open), this being the condition corresponding to mis-operation of the dispenser, when it is particularly desired to have the mis-operation-responsive switch 183 remain closed for energization of the master relay 178. So to hold the mis-operation-responsive switch 183 closed in such circumstances, the switch closing means 131 is connected to the mis-operation-responsive switch 183 for retaining the mis-operation-responsive switch in closed position when the latter is moved thereto and when said switch closing means is concurrently in its identification-switch-open position. In particular the operating leaf 186 of the switch (FIGURES 23, 13, 14, 15, and 16) is formed with an extension 187 having a lip 188 at the end, and an insulating detent-bar 189 is mounted to engage the extension 187 and lip 188. The detent-bar 189 is particularly mounted on a body 190 which is in turn pivoted on the shaft 173 and for being engaged by detent element 172 whenever the latter moves towards its detenting position in relation to actuating switch 169, so that the detent-bar 189 is then pushed by the detent element 172 into a position completely underlying the extension 188 of the mis-operation-resive switch 183 (FIGURE 21); but the connection between the two detent elements is a lost-motion connection permitting the detent element 172 to withdraw from its own detenting position without carrying the detent-bar 189 along in train. The detent-bar 189 and body 190 are loaded as by a spring 191 (FIGURES 14 and 16) for following the detent element 172 toward the latter's withdrawn position, but the bar is restrained by the lip 188 whenever the detent-bar 189 begins such motion from its position engaging the extension 187 of the switch 183 i.e., whenever the motion begins with the switch 183 in open position as in FIGURE 22. On the other hand, if the switch 183 be closed (FIGURE 21), then the extension 187 is raised and the lip 188 along with it to clear the detent-bar 189 for motion, and if the detent element 172 is concurrently withdrawn (FIGURE 25), then the detent bar 189 moves under the urging of its spring 191 to its own "detent position" underlying the lip 188, it being noted in connection with FIGURE 27 that the two detent elements are proportioned so that detent bar 189 must arrive beneath lip 188 before detent 172 withdraws completely from switch 169, so that no condition can arise when all of the switches can operate without detenting (which condition would permit dispensing without recording), so as to prevent the switch 183 from opening, especially when the cam follower 166 descends into the next lowered portion 168 of the cam 163 (FIGURE 23), closing the pulsing switch 162 for a power pulse; and detenting motion of the detent-bar 189 is limited as by an extension 192 (FIGURE 16) formed on the body 190 and bearing against a projection 193 formed on the chassis of the selector mechanism 27, so as to hold the detent-bar 189 in its detenting position underlying the lip 188 of the switch 183. Concurrently the actuating switch 169 is held closed as by spacer 171 bearing against leaf 186 of the switch 183, and in effect the condition referred to above as corresponding to mis-operation of the dispenser results, with all three switches 169, 183, and 162 closed to transmit a power pulse to the relay 178 to stop power to the dispenser 21. The mis-operation in this example consists in not having used a key to operate the lock 65 and to arrange the code plates 121—124 in a fresh array to identify the holder of the key; for if the lock is not operated (FIGURES 17 and 16), then the detent element 146 is not removed from the path of the T-bar 131 and the T-bar holds the detent element 172 in "withdrawn" position not engaging the body 190; and the latter is freed to move (FIGURE 24) to its detenting position (FIGURE 25) (if it is not already there) upon rotation of the cam 163 to its next pulse-breaking position in response to flow of gasoline through the meter 22; and upon further rotation of the cam 163 to its next pulse-making position (FIGURE 23), the pulse generated is transmitted to the relay 178 instead of to the registers 23—25, etc. (the register circuit, of course, being open because the switch closing means 131 has not been permitted to operate and all of the identification switches 78—93 are still open).

Figure 23:
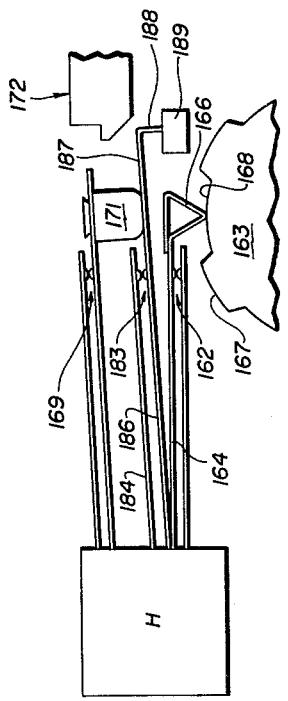
FIGURE 23 is an alternative view showing the apparatus of FIGURE 20 in another position.

FIGURE 24 shows the arrangement obtaining when the dispenser has been stopped in the middle of a pulse and the hose nozzle has been hung up, withdrawing detent 172 from detenting position. FIGURE 20 shows the arrangement obtaining when a new dispensing operation is properly begun with lifting of the hose nozzle and use of a key, but with no registering pulse being transmitted at first. FIGURE 21 shows continuing proper operation at the first (or any) "no-pulse" position. FIGURE 22 shows continuing proper operation at the second (or any subsequent) "pulse" position with transmission of a registering pulse. FIGURE 26 shows the stopping of the dispenser in "pulse" position and the beginning of the withdrawal of detent elements 172 and 189 upon hanging up the hose nozzle, with element 189 being stopped by lip 188 of switch 183; and so back to FIGURE 24. FIGURE 27 shows the dispenser stopped in the middle of a "no-pulse" phase and the beginning of withdrawal of the detent elements 172 and 189 upon hanging up the hose nozzle. FIGURE 25 shows the dispenser stopped in the middle of a "no-pulse" phase with the nozzle properly hung up. Both FIGURES 24 and 25 also illustrate the two possible beginning positions for improper operation of the dispenser without closing one of the identification switches 78—93; and FIGURE 23 illustrates the "alarm" condition subsequently resulting after initial rotation of the cam 163, wherein the circuit is arranged to actuate the master relay 178 and stop flow from the dispenser. It is noted that as here illustrated the master relay 178 stops flow from all the dispensers of the system, but it will be apparent that, within the scope of the invention, the master flow control means may be arranged to stop flow from the mis-operated dispenser only.

Thus it is seen that the master flow-control means 177 broadly constitutes a means requiring that the transmitter be connected to one of the registers throughout the operation of the dispenser, and comprises an alarm means sensitive to and functioning upon operation of the dispenser with the meter 22 unconnected to a register, the term "alarm means" being taken here to mean a means taking alarmed action tending to correct the mis-operation condition, either by stopping flow from the dispenser, or by producing an audible alarm signal (as with the buzzer 212 described hereinbelow), or both. In detail the combination comprises a manually-operated flow control means (the actuating switch 36 for the pump motor 34), FIGURE 1, a master flow-control means 177 (FIGURE 19) connected to the dispenser 21 for automatically controlling the flow therefrom, and mis-operation-responsive means (as described) connected to both the manual and master flow-control means and to the selector mechanism 27 and functioning on operation of the manual flow-control means (as by sensing of the meter 22 and consequent operation of the transmitter 67) without concurrent operation of the identification means 31 (which if not operated prevents the switch closing means 131 from operating) to actuate the master flow-control means 177 to stop flow from dispenser 21 (since if the switch closing means 131 is not operated, then the detent elements 172 and 189 are automatically disposed to connect the transmitter to the relay 178 and to stop flow from the dispenser as soon as the dispensing operation begins).

In order to prevent improper operation of the dispenser 21, as by beginning a dispensing operation without using the identification means 31 and by holding the dispensing nozzle 44 in "flow" position so that the mechanism operates in short spurts with the momentum induced by each spurt turning the cam 163 to a new "no-pulse" condition permitting power to the dispenser 21 to be restored temporarily, the mis-operation-responsive means previously described also includes a response-perpetuating means therefor, which increases the time period between spurts to a period greater than the stopping time of the pump and motor. This response-perpetuating means is adjustable to perpetuate the master flow-control means 177 in its stop-flow condition for a substantial time period, even when the original mis-operation condition has been meanwhile corrected, as for instance by setting the nozzle 44 in its own "no-flow" condition. The response-perpetuating means includes a timing motor 194 (FIGURE 19) connected to a normally open switch 195 across the lead lines of the power sources 97, so that whenever the switch 195 is closed the timing motor is set in operation; and the switch 195 is arranged to be controlled by the master relay 178 so that whenever the relay 178 is energized the switch 195 is closed and the timing motor 194 begins to operate. The timing motor 194 is connected to operate a rotating cam 196 having a number of spaced-apart lowered portions 197, 198, 199, 200, etc., formed on the rotating cam surface thereof; and a cam follower 201 is disposed engaging the cam surface of the cam 196 and is arranged to close a switch 202 whenever the cam follower 201 is not in one of the lowered portions 197—200 etc. The switch 202 is connected in parallel with the switch 195 and it will be seen that the cam follower 201, beginning always from a position engaging one of the lower portions, as for instance the lower portion 200 shown in the drawing, immediately closes the operating circuit of the timing motor 194 as soon as the timing motor begins to operate and relieves the timing motor from dependence upon the switch 195 and the relay 178, so that the timing motor will always continue to operate at least until the next lowered portion (197) arrives at the cam follower 201, even though the master relay 178 is de-energized meanwhile. Another cam follower 203 is disposed engaging the cam surface of the cam 196, being particularly arranged never to be engaging any of the lowered portions 197—200 etc., at the same time that the cam follower 201 is engaged in one of the lowered portions. The cam follower 203 is connected to close a switch 204 when the cam follower is not in one of the lowered portions and to open the switch 204 when the cam follower 203 is in one of the lowered portions. The switch 204 is connected in series with electrical ground, a switch 206, the master relay 178, the rectifying diodes 301 and 302 of the power unit 98. The switch 206 is arranged to be controlled by the relay 178 so that the switch 206 is open whenever the relay 178 is not energized and closed when the relay 178 is energized. Thus it will be seen that the switch 204 being always closed whenever the timing motor 194 is not operating, then the switch 206 is closed by the relay 178 whenever it is energized so as to complete a subsidiary ground circuit for the relay 178 maintaining the latter in energized condition, even when the original mis-operation condition has been corrected, and so long as the circuit is not broken by opening of the switch 204 as when one of the lowered portions (199) of the cam 196 arrives at the cam follower 203. The time required for the first lowered portion 199 to arrive at the cam follower 203 may be determined by adjusting the dimensions of the cam 196, the spacing between the lowered portions 197—200 etc., and the speed of rotation of the timing motor. Thus it will be seen that whenever the relay 178 is energized in response to a mis-operation condition, it immediately closes the switch 206 and perpetuates its own energizing circuit for a desired time period; the switch 195 is also closed at the same instant, starting operation of the timing motor 194, and immediately thereafter the switch 202 is closed for perpetuating the operation of the timing motor throughout its timing operation. As soon as the first lowered portion 199 arrives at the cam follower 203, the subsidiary circuit through the switch 204 is broken, and if the original mis-operation condition has been corrected meanwhile, then the switch 206 will be opened as by de-energization of the relay 178, and will remain open so that as the lowered portion 199 moves on past the cam follower 203 the relay 178 is not re-energized. Because of the switch 202 however the timing motor continues to operate until the next lowered portion 197 arrives at the cam follower 201 at which time the switch 202 is opened and the operating circuit to the timing motor 194 is broken. Thus the elements are always set to begin an operation from the position shown with the switch 202 opened and the switch 204 closed. If the original mis-operation condition has not been corrected by the time the first lowered portion 199 arrives at the cam follower 203, then the relay 178 remains energized even though the switch 204 is temporarily opened, and the switch 206 remains closed. As the timing motor 194 continues to rotate the cam 196, the cam follower 203 rises out of the lowered portion 199 and the switch 204 is again closed, to remain closed until the arrival of the next lowered portion 200. In effect then the apparatus is arranged to perpetuate the actuation of the master flow control means in stop-flow condition for a desired time period, and at the end of each time period to "look back" to see if the original mis-operation condition has been corrected. If the mis-operation condition has not been corrected, then the stop-flow condition is perpetuated for another time period and so on, until the mis-operation condition is corrected; and when the mis-operation condition is corrected the response perpetuating means permits the master flow control means to return to flow condition, and continues the operation of its own timing motor for a short time to reset itself at its beginning position. This arrangement foils persons attempting to mis-operate the dispenser in short spurts by making the time between spurts impracticably long, and by filling these long intervals with an alarm condition such as sounding of the buzzer 212 (see below) tending to discourage the thief. Of course when the cam 163 stops in a "pulsing" position as shown in FIGURE 23, the alarm condition is positively set up and remains in effect independently of the response-perpetuating means, and this condition is bound to be arrived at sooner or later by random position of the cam 163 during such attempted mis-operation.

As described above the power to the dispenser is cut when ever the master relay 178 is energized, and the circuit is arranged so that energization of the relay 178 causes de-energization of relay 63 to open the switches 61 and 62. The energization of master relay 178 and de-energization of relay 63 constitutes a first mode of operation of the master flow-control means in stopping power from the dispenser; but separate de-energization of relay 63 is also possible, and constitutes a second mode of operation of the master flow-control means. In effect this arrangement constitutes a "fail-safe" means adapted upon failure thereof for automatic actuation to stop flow from the dispenser. Any failure of the relay 63 as by cutting of the leads thereto or as by failure of the power source 97 or cutting of the leads from the power source will cause the de-energization of the relay 63 and the opening of the switches 61 and 62 cutting power to the dispenser. Thus it would not be possible for a person with larcenous intent to obviate the functioning of the recording apparatus and the master flow control means therefor by breaking the power circuit in the apparatus, because upon breaking the power circuit the relay 63 is automatically de-energized and the switches 61 and 62 are opened. Switches 207 and 208 are connected in parallel with the switches 61 and 62 and are hand operable to restore power to the power source through power lines 37 and 38 in the event that it is desired to override the action of the master flow control means, and the switches 207 and 208, the switches 61 and 62, and the relay 63 are kept in locked boxes accessible only to specially authorized persons, such as the gasoline station superintendent. Switches 209 and 210 are provided in the power source 97 to control the operation of the source. A buzzer 212 or other audible alarm means is connected in series with a normally open switch 213 across the leads from the power source 97, and the switch 213 is arranged to be closed upon energization of the relay 178 to serve as an audible signal whenever the master flow control means is operated to stop power to the dispenser, and serves to alert station personnel whenever something goes wrong. A switch 214 may be provided in parallel with switch 213, and a switch 215 in parallel with switch 182, the switches 214 and 215 being mechanically connected for manual operation together and being normally open, so that whenever it is desired to override the action of the master flow control means in stopping power to the dispenser the switches 214 and 215 may be closed, re-energizing the relay 63 and sounding the buzzer as an alarm to indicate that overriding action has been taken. The two switches are accessible from outside the locked box in which they are contained, but for closing only, so that they may be closed by any station personnel; but they cannot be reopened from outside the box, and must be reopened by the station superintendent who has a key to the box. Thus the station superintendent is alerted that unrecorded dispensing may have taken place, and can take steps to correct the records. As a further refinement of the master flow control means, it is noted that each of the registers 23–25 etc., has its incoming lead from the transmitter 67 connected through a bus bar such as the bus bars 217, 218, etc., so that whenever it is desired to inactivate one of the registers as when the key corresponding to the register has been stolen or it is suspected that a duplicate has been made, then the register may be disconnected from the bus bar and the bus bar connected directly to the relay 178, and the relay will be energized to stop power to the dispenser whenever the suspected key is employed. Another safeguard lies in the circumstance that if an attendant attempts to operate two dispensers concurrently but both connected to his own register, so as to cause confusion of the pulse signals transmitted thereto and consequent charging to him of less quantity than he actually dispensed, then the master relay 178 will automatically be energized to cut power to the dispensers and to sound the buzzer 212. The alarm means automatically senses the concurrent connection of more than one meter to the same register, and stops the flow; particularly the alarm means senses the use of one key for concurrent operation of a plurality of dispensers, for when more than one dispenser is employed in the station then each register is connected to the same corresponding identification switch (78—93) at each dispenser, and the respective meters 22 and associated cams 163 etc., and switches 162, 183 and 169 being naturally arranged to correspond only randomly in phase, a situation will sooner or later arise during the operation of both dispensers simultaneously when switches 169 and 162 at one dispenser are closed while the switch 183 at the other dispenser is also closed, and a circuit is completed from ground through the closed switches 169 and 162 to the register and back through the closed switch 183 at the other dispenser to the master relay 178 and the power transformer 98 to energize the master relay 178 and cut the power to all of the dispensers.

As a feature of the locked security of the system of the invention, the registers 23—25 etc. are kept in a locked box accessible only to supervisory personnel.

As another feature of the invention there may be provided a thermostatic control switch 219 connected to supply power to a set of electrical heaters 221, etc., one heater being placed in each of the selector mechanism 27 chassis for heating the apparatus in the event of cold weather. The thermostatic switch 219 is set to close at approximately 40° F. and is exposed to external ambient temperatures. It is connected in series with a power transformer 222, the assembly being connected across the leads from power source 97, and the heaters 221 etc., are connected in parallel between the transformer 222 and electrical ground, the other side of the transformer being also grounded.

Referring now to FIGURES 11 and 9 the identification means 31 is seen to have a gating means (in this example the tumbler pin 74) normally holding the lock 65 in closed position. The tumbler pin 74 is formed to have three separate segments 74a, 74b, 74c, the pin being arranged with its segments in assembled position to have an interface 74ab between the segments 74a and 74b and an interface 74bc between the segments 74b and 74c; and the pin 74 is mounted in the rotor 69 and with the segment 74c projecting from the rotor into the housing of the lock 65 so that the rotor 69 cannot be turned unless the segment 74c is moved out of the way. When a first of two keys 66 etc., is inserted in the lock, the pin 74 is pushed upward by the key until the interface 74bc comes into alignment with the interface between the rotor 69 and lock housing, and in this "gating" position of the pin 74, the rotor 69 can be freely rotated by the key. The second key is formed differently from the first key in that when the second key is inserted into the lock the key pushes the pin 74 up until the interface 74ab come into alignment with the interface between the rotor 69 and the lock housing, this position being the second "gating" position of the pin 74. When the pin is in its first gating position as above described then the pusher bar 113 is lifted by the pin to the first position from which it is translated as by rotation of the rotor 69 and shaft 102 to bear against a lower end of the rocker arm 118 and to thus translate the code plate 124 to a first position in which one of the notches 126 is aligned with the identification switch 78; and upon operation of the switch 78, the switch is closed and an electrical signal is transmitted to identify the first of the keys as the one that was used to operate the lock. When the second key is used, then the pin 74 is lifted to its second gating position raising the pusher bar 113 to the second position for bearing against the upper end of the rocker arm 118 upon rotation of the rotor 69, and for translating the code plate 124 to a second position in which none of the notches 126 is aligned with the identification switch 78, so that the switch 78 cannot be operated and no signal can be sent through the circuit of which the switch 78 is a component.

The lock 65 has a housing 223 and the rotor 69 is journaled for rotation in the housing 223 and is formed with a key receiving slot 224, the tumbler pin 74 being arranged projecting into the slot 224 for engagement with either of the keys 66 etc.

The rotor 69 and housing 223 have a rotary interface 226, the pin 74 being normally disposed with its two gating interfaces 74ab and 74bc out-of-alignment with the rotary interface 226.

The code plate 124 constitutes a detent means for blocking the operation of the switch 78 in one of the positions induced in the plate by movement of the pin 74 to one of its rotor-freeing positions, and permitting operation of the switch when the plate is in its other position as induced by movement of the pin 74 to its other rotor-freeing position.

As previously described the connection between the switch 78 and pin 74 includes the cam 103 fastened to the back of the rotor 69 (FIGURE 18), the cam follower 101, the shaft 102, the spring-loaded rocker bracket 104, and the pivoted pusher bar 113 actuated by rotation of the rotor 69 and directed by the positioning of the pin 74 to bear against one end or the other of rocker arm 118 for positioning the code plate 124 in either its blocking or permitting positions with respect to the switch 78, and in correspondence with the positioning of the pin 74 in one or the other of its rotor-freeing pin positions.

In the identification means 31 as above described the "gating" means that normally holds the lock (i.e., the rotor 69) in closed position may be a single one of the tumbler pins, such as the tumbler pin 74, the other pins being absent from the combination, or it may comprise a plurality of pins as illustrated, including the pins 71, 72, 73, 75 and 76. If only one pin such as the pin 74 is used, the essential requirement is that the pin be displaceable to at least two different "gating positions" freeing the lock for opening, i.e., the two gating positions in which the interfaces 74ab and 74bc are brought into alignment with the interface 226 between the rotor and rotor housing. If more than one pin is used, then the essential requirement is that the combination of pins be displaceable to at least two gating positions. For example if the three-segment pin 74 be used in combination with the two-segment pin 75, the other pins being absent from the combination, then the combination of the two pins must be displaceable to one gating position in which the interface 75ab existing between the segments 75a and 75b of the pin 75 is brought into alignment with the interface 226 while at the same time the pin 74 is brought into a position with its interface 74ab in alignment with the interface 226; and the other gating position of the combination of the two pins is that in which the interface 75ab is brought into alignment with the interface 226 while at the same time the interface 74bc of the pin 74 is brought into alignment with the interface 226. In other words any number of tumbler pins may be used each having any number of segments and any number of corresponding interfaces, so long as the combination of pins is displaceable to a plurality of positions freeing the lock for opening. For example if it is desired to have a large number of gating positions for the gating means but a small number of pins, then pins composed of four or five segments having three of four gating interfaces may be used. Furthermore, any number of electric switches may be used, and the means connecting the switches and the gating means may be arranged to effect the selective operation of the switches in any combination desired; for example two or more switches may be selected for operation in combination at the same time, the essential requirement being that for each combination of switches there be a different gating position for the combination of tumbler pins.

In the above described form of the invention in which there is only one tumbler pin 74 having two gating positions and one code plate 124 connected to the tumbler pin 74, the code plate 124 is formed as a detent means disposed for blocking the operation of the identification switch 78 and permitting the operation of the identification switch 79 in one of the gating positions of the pin 74; and the detent means code plate 124 is also disposed for permitting the operation of the switch 78 and blocking the operation of the switch 79 in the other gating position of the pin 74. Of course the keys 66, etc. are formed with different combinations of cam surfaces 227, 228, 229, 230, 231 and 232 (or any smaller or larger number of cam surfaces corresponding with the number of tumbler pins used in the lock), these cam surfaces being positioned in each key so that each key has a different combination of cam surface positions for bearing against the tumbler pins and for moving the tumbler pins to a different combination of positions for each key. Thus if only one tumbler pin 74 is used, pin 74 having two different gating positions, then only two keys need be used each key having the corresponding cam surface 230 etc., thereof formed in a different position in the key for bearing against the pin 74 and pushing it to a different one of its gating positions for each key. Thus when one of the keys is used a first one of the switches will be selected for operation and the other switch will be blocked; whereas when the other key is used the second switch will be selected for operation and the first switch will be blocked, and this resulting selection of the switches serves to identify which one of the keys is used to operate the lock.

In the above described form of the invention any number of electric switches may be used and may be selected for operation one at a time, so long as the same number of keys is provided; and any number of detent element code plates such as the code plate 124 may be used, so long as there is provided one multi-positionable code plate for each of the tumbler pins, and so long as the total combination of code plates is positionable by the pins in a number of different arrays each permitting the operation of a different switch and blocking the operation of the other switches, the number of arrays corresponding with the number of keys, the number of switches, and the number of different gating positions that the total assembly of pins is positionable in. In other words if there are P tumbler pins each having N gating positions, P code plates each connected to a different pin for positioning in N positions, then the tumbler pin assembly and the code plate assembly each has $N^P$ possible arrays, and the combination may therefore be used with $N^P$ different switches and with $N^P$ different keys. In the form of the invention illustrated $N=2$ (two gating positions for each tumbler pin and two positions for each code plate), $P=4$ (four tumbler pins and four code plates), and $N^P=16$ (sixteen switches and sixteen keys).

With five pins and five plates each having two positions, then $N=2$ and $P=5$ and $N^P=2^5=32$ switches and thirty-two keys can be used. With two pins and two plates, each having three positions, then $P=2$ and $N=3$, and $N^P=3^2=9$ switches and nine keys can be used, and so on.

Figure 7:
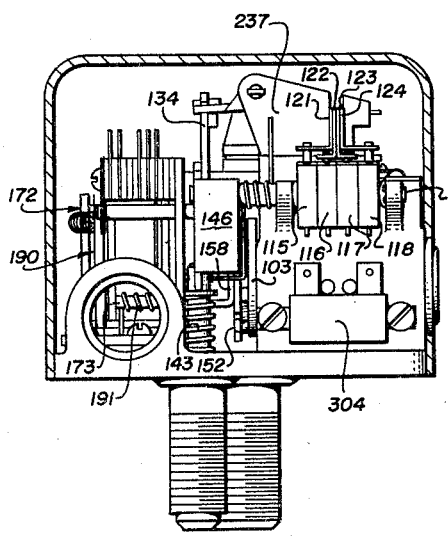
FIGURE 7 is a fragmented cross-sectional elevation view taken substantially on the plane of line 7—7 of FIGURE 5.
Figure 4:
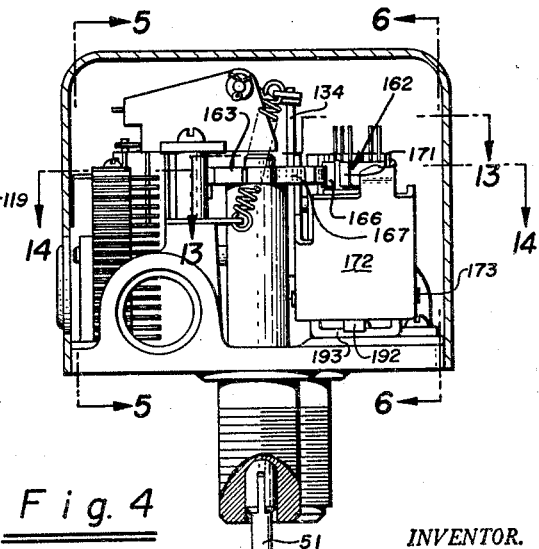
FIGURE 4 is a fragmented front elevation view, on an enlarged scale, of a portion of the apparatus enclosed by circle 4—4 of FIGURE 1, the front of the housing and some of the electrical wiring being removed to expose the interior mechanism.

In FIGURES 28–35 the code plates 121—124 are shown in dis-assembled condition, each in elevation from the side. Plate 121 has a flange 233 projecting horizontally to one side of the plate; plate 122 has a flange 234 spaced relatively lower on the plate than the flange 233 of plate 121 and extending in the same direction, but not so far as the flange 233; plate 123 has a flange 235 at the same level as the flange 234 of plate 122 and extending in a direction opposite to the direction of extension of the flange 234; and plate 124 has a flange 236 at the same level as the flange 233 of the plate 121, but extending in a direction opposite the direction of extension of the flange 233, and extending further than the flange 235 of plate 123. This arrangement and spacing of the flanges is made for the purpose of rendering the flanges individually accessible to the corresponding actuating extensions from the rocker arms 115—118 when the code plates are nested together in sliding parallel arrangement in a mount 237 as shown in FIGURE 7. The plates are retained for relative longitudinal sliding motion as by pins 251 and 252 (FIGURES 12 and 28–35) mounted in mount 227 and transpiercing all the plates as by elongated slots 253, 254, 255, 256, 257, 258, 259, and 260 formed therein. The extension from each rocker arm 115—118 is fitted into a socket hole (not numbered) in the corresponding code plate, so as to slide the code plate back and forth between its two positions when the rocker arm is rotated. Each code plate has a notched edge in which is formed a plurality of notches 126, and in the nested position of the code plates as shown in FIGURE 12, the plates are aligned with the notched edges engaging the identification switches 78—93. In FIGURES 28–35 the dis-assembled code plates are particularly shown in schematic alignment with the switches 78—93, so as to illustrate the functioning of the code plates in selecting the switch to be operated. The plates are shown in their second gating position (i.e. their left-hand position as viewed in the drawing). To attain their first positions, any or all of the plates are moved to the right as viewed in the drawing for a travel-distance equal to one-half the spacing distance between the switches. It will be clearly seen that in the position shown, the plates are arranged to block operation of all the switches 78—92 and to permit operation of the switch 93. If the code plate 121 is now moved to the right to its first position, then the array of plates will be such as to permit the operation of the switch 92, and to block the operation of all of the other switches. By similarly varying the array of the plates, any one of the switches can be permitted to operate, and it will be clearly seen that in any array possible to the plates (as defined for the two positions of each plate) all of the switches but one will be blocked.

As previously described, the connection between the rotor 69 and the code plates 121—124 is a lost-motion connection (as between the pusher bars 110—113 and the rocker arms 115—118) for maintaining the code plates in their switch-selecting positions upon regressive motion of the rotor 69 as for removal of the key that was employed to rotate the rotor.

It will be noted that each of the plates 121—124 has a notch 307 near the left-hand end (FIGURES 28–35) and adjacent the leftmost notch 126 of the plate. In these figures and in FIGURES 5, 6, 8 and 12 there is also shown a locking plate 306, which is formed on the rocking plate 127 in parallel with the switches 78—93 and rotates with the switches so as to fall always either into the notch 307 in each plate 121—124 or, if the plate 121—124 is traversed fully to the left as shown, then into the left-most notch 126 of the plate. The raised portion between the notch 307 and the leftmost notch 126 is dimensioned to be equal to the traverse distance of the plate on pins 251—252, less the thickness of locking plate 306, so that the locking plate 306 cannot descend into either notch unless the code plate is at extreme right or left traverse, and if the locking plate cannot descend, then the rocking plate 127 cannot rotate and the switched 78—93 cannot be closed, so that an alarm condition is prepared as by blocking of the rotation of T-bar 131 by the rocking plate 127. On the other hand, if the code plates have once been properly aligned and the locking plate 306 has descended, then the alignment cannot thereafter be altered by vibration or other means. This arrangement ensures that once a key has been used to unlock the detents, but before the pump motor is turned on, the identification set on the code plates cannot be altered as by insertion and partial turning of a different key, or by banging and shocking the housing of the device, without creating the conditions leading to an alarm when dispensing is begun.

As shown in FIGURE 17 the connection between the switch closing means 131 and the switches 78—93 permits the switch closing means 131 to co-function with the code plates to close the selected switches; and the connection between the rotor 69 and the switch closing means 131 is arranged to restrain operation of the switch closing means 131 (as by the extension 158 that is formed on the arm 138 of the switch closing means 131 and the cam surface 159 of the extension 158, which bears against the lug 157 extending from the rotor cam 103 whenever the rotor is in any stage of rotation except its initial starting position), the restraint upon the operation of the switch closing means being effective until the full regressive movement of the rotor 69 is completed. This arrangement insures that the cam 103 lug 154 is returned to its initial position before the switch closing means 131 is operated, so that the arm 152 is freed to return to its initial position as soon as the switch closing means is operated, thus in turn insuring that the very next time that the switch closing means 131 is returned to its initial position as by termination of a dispensing operation, then the detent element 146 is unhindered by the arm 152 and is free to block return of the switch closing means 131 to its switch closing position and requiring a new use of one of the keys 66, etc., whenever it is desired to initiate a new dispensing operation.

Each of the switches 78—93 has a contact point 238 (FIGURE 12) insulatingly mounted with respect to all of the other contact points and connected to a different terminal of the terminal post 128 (FIGURE 5) mounted on the chassis of the selector mechanism 27 for convenience in making the required electrical connections with other portions of the apparatus; and each switch has an operating leaf 239 (FIGURE 12) mounted on the rocking plate 127, the plate forming an electrical current path for the leaves and being electrically connected to the terminals of switch leaves 164 and 186 as shown in FIGURE 19. All of the operating leaves are movable to and from switch closing positions when the rocking plate 127 is moved by the switch closing means 131, the rocking plate being spring-loaded for return movement. Each of the operating leaves 239 etc., is formed of a thin wire of conducting material, and is springy and flexible so that when it encounters the detent portion between the notches of any of the code plates, it is bent out of straight alignment and fails to close to contact position with its corresponding contact point 238, the code plates 121—124 being disposed in the paths of the switch leaves 239 and being movable to the positions above described permitting and preventing the movement of the operating leaves to closed positions.

We claim:

1. In a registering apparatus of the character described to be used by a plurality of attendants, the combination comprising, a plurality of fluid dispensers, a plurality of meters each associated with and sensing the quantity of fluid dispensed by a different one of said dispensers, a plurality of signal transmitters connected one to each of said meters and emitting a signal as a function of the quantity of fluid dispensed, a plurality of registers assigned one to each attendant and each register being responsive to said signal for registering the quantity of fluid dispensed, a plurality of selector mechanisms connected one to each of said transmitters and each selector mechanism being disposed for selective connection of the associated transmitter to any of said registers, each of said selector mechanisms including a lock, and a family of related keys for said locks for issuance one key to each attendant, and each key co-functioning with any of said locks and selector mechanisms to connect the associated transmitter with the register representing the individual holder of the key.

2. A registering apparatus as described in claim 1, said meter having a rotating indicator; wherein said transmitter comprises an electric current pulsing means coupled to said rotating indicator and having output pulses varying as a function of the rotation of said indicator, said registers being responsive to said current for cumulatively registering the number of pulses received.

3. In a registering apparatus for use by a plurality of attendants, the combination comprising: a fluid dispenser; an electric signal transmitter connected to said dispenser and emitting a signal as a function of the quantity of fluid dispensed; a plurality of registers assigned one to each attendant and each register being responsive to said signal for registering the quantity of fluid dispensed; and a selector mechanism connected to said transmitter and disposed for selective connection to any of said registers; said selector mechanism including a lock having a rotor, a family of related keys for issuance one to each attendant and each fitting said lock, a plurality of tumbler pins normally restraining the movement of said rotor and being variously responsive to said keys to release said rotor for rotation, a plurality of electric identification switches one for each key, and means connected to said rotor and actuated upon rotation thereof and cofunctioning with said pins to effect selection of the one particular identification switch corresponding to the employed key for operation of said switch in connecting said transmitter to the corresponding register.

4. A registering apparatus as characterized in claim 3 wherein said dispenser has a manually actuated fluid flow-control means having flow and no-flow positions, and wherein said rotor-actuated means is adjusted to complete said switch-selection only upon a full progressive rotation of the rotor and to retain said selection upon full regressive rotation of said rotor to release said key for removal, and wherein said rotor-actuated means co-functions with switch-closing means connected to said flow-control means and actuated thereby to close the selected identification switch upon movement of the flow-control means to flow position, and means connected to and co-functioning with the regressive movement of said rotor and functioning on movement of said flow-control means to its no-flow position to prevent a subsequent operation of said switch-closing means except upon a subsequent full progressive rotation of said rotor.

5. A registering apparatus as characterized in claim 4 and including means connected to said switch-closing means and said rotor and preventing operation of said switch-closing means to close the selected identification switch except upon full regressive movement of said rotor to the starting position thereof.

6. A registering apparatus as characterized in claim 4, wherein said dispenser includes a meter sensing the quantity of fluid dispensed; and said transmitter includes a make-and-break pulsing switch connected in series with each of said identification switches and their corresponding registers, and a rotating cam connected to said meter for rotation upon actuation of said meter, said cam being shaped for and connected to said pulsing switch for intermittently opening and closing said pulsing switch upon rotation of said cam to produce said signal as a series of electric pulses the number thereof corresponding with the quantity of fluid dispensed.

7. A registering apparatus as characterized in claim 6, wherein said transmitter also includes an actuating switch connected in series with said pulsing switch and said identification switches and connected to said rotating cam for opening when the pulsing switch is closed and for closing when the pulsing switch is open, said switch-closing means being connected to said actuating switch for retaining the actuating switch in closed position when the latter is moved thereto and when said switch-closing means is concurrently in said indentification-switch-closing position, whereby said transmitter, upon being activated from a position representing the middle of a previously-registered pulse, is constrained to delay the initiation of transmission until further activated for the next subsequent pulses, and an erroneous registering of two pulses when only one is correct is avoided.

8. A registering apparatus as characterized in claim 6 and also including: a master fluid flow-control means connected to said dispenser and having flow and no-flow positions and being responsive to any of said electric pulses to assume said no-flow position for the duration of said pulse; and a misoperation-responsive switch connected in series with said pulsing switch and said master flow-control means and connected to said rotating cam for opening when the pulsing switch is closed and for closing when the pulsing switch is open, said switch-closing means being connected to said misoperation-responsive switch for retaining the misoperation responsive switch in closed position when the latter is moved thereto and when said switch-closing means is concurrently in said identification-switch-open position, whereby flow from the dispenser is automatically stopped upon any attempt to dispense without concurrent use of one of said keys to identify the operator.

9. A registering apparatus for a fluid dispenser used by a plurality of attendants and including a manually-operated flow-control means and a meter sensing the quantity of fluid dispensed, comprising: a plurality of registers assigned one to each attendant; and a selector mechanism connected to said meter and disposed for selective connection to any of said registers for registering the sensing of said meter thereon, said selector mechanism also including identification means manually operable by and selectively responsive to each attendant to connect the meter to his own register only; a master flow-control means connected to said dispenser for automatically controlling the flow therefrom; and misoperation-responsive means connected to said manual and master flow-control means and said selector mechanism and functioning on operation of said manual flow-control means without concurrent operation of said identification means to actuate said master flow-control means to stop flow from said dispenser.

10. A registering apparatus as described in claim 9, wherein said misoperation-responsive means includes a response-perpetuating means adjustable to a desired time period to perpetuate the actuation of said master flow-control means in said stop-flow condition throughout said time period even when the misoperation condition has been meanwhile corrected.

11. A registering apparatus as characterized in claim 9, wherein said master flow-control means is a fail-safe means having two modes of operation in stopping flow from said dispenser and operates in the second mode upon failure of the means for operation in the first mode.

12. A registering apparatus for a plurality of fluid dispensers used by a plurality of attendants and each dispenser including a meter sensing the quantity of fluid dispensed thereby, comprising: a plurality of registers one assigned to each attendant; a plurality of selector mechanisms connected one to each of said meters, each selector mechanism being disposed for selective connection to any of said registers for registering the sensing of the meter thereon, and each selector mechanism including identification means manually operable by and selectively responsive to each attendant to connect the associated meter to his own register; and alarm means sensing the concurrent connection of more than one meter to the same register.

13. A registering apparatus as characterized in claim 12, wherein said alarm means functions to stop flow from at least one of the concurrently connected dispensers.

14. A registering apparatus as characterized in claim 12, wherein said alarm means also senses the operation of any dispenser with the meter thereof unconnected to a register.

15. In a registering apparatus of the character described to be used by a plurality of attendants, the combination comprising, a plurality of fluid dispensers; a plurality of meters each associated with and sensing the quantity of fluid dispensed by a different one of said dispensers; a plurality of signal transmitters connected one to each of said meters and emitting a signal as a function of the quantity of fluid dispensed; a plurality of registers assigned one to each attendant and each register being responsive to said signal for registering the quantity of fluid dispensed; a plurality of selector mechanisms connected one to each of said transmitters and each selector mechanism being disposed for selective connection of the associated transmitter to any of said registers, each of said selector mechanisms including a lock, and a family of related keys for said locks for issuance one key to each attendant, and each key co-functioning with any of said locks and selector mechanisms to connect the associated transmitter with the register representing the individual holder of the key; and means sensing the use of one key for concurrent operation of a plurality of dispensers and being connected and functioning in that event to terminate operation of the connected dispensers.

16. In a registering apparatus, a fluid dispenser arranged for use by a plurality of attendants, a transmitter connected to said dispenser and producing a signal as a function of the fluid discharge from said dispenser, a plurality of registers assigned one to each attendant and each register being responsive to said signal for registering the output of said dispenser, a manually operable selector mechanism connected to said transmitter and said registers for selective connection of said transmitter to any of said registers, and means requiring that said transmitter be connected to one of said registers through said selector mechanism throughout the operation of said dispenser.

17. A registering apparatus as characterized in claim 16 and including a meter and computer sensing the value of the fluid dispensed and wherein said transmitter is operatively connected to said computer for producing an output signal as a function of said value and for recording said value at said register.

18. A registering apparatus as characterized in claim 17 and including a plurality of dispensers dispensing fluids having different values, a plurality of transmitters connected to said dispensers and including computers converting the unit volume output of said dispensers to preset monetary values, and a plurality of selector mechanisms connecting said transmitters to said registers whereby said several computers and transmitters function to convert varying outputs of said several dispensers to a common monetary denomination for accumulative recording on said registers.

19. In a registering apparatus of the character described to be used by a plurality of attendants, the combination comprising, dispensers, a plurality of signal transmitters connected one to each of said dispensers and emitting a signal as a function of value of the fluid dispensed, a plurality of registers assigned one to each attendant and each register being responsive to said signal for registering the value of fluid dispensed, a plurality of selector mechanisms connected one to each of said transmitters and each selector mechanism being disposed for selective connection of the associated transmitter to any of said registers, each of said selector mechanisms including a plurality of attendant identification means one assigned to each attendant, and each identification means co-functioning with any of said selector mechanisms to connect the associated transmitter with the register representing the attendant to whom the identification means is assigned.

References Cited in the file of this patent

UNITED STATES PATENTS

| | | |
|---|---|---|
| 2,138,781 | Brouse | Nov. 28, 1938 |
| 2,510,093 | Ferguson et al. | June 6, 1950 |
| 2,522,845 | Stevens | Sept. 19, 1950 |
| 2,833,859 | Ruhmel et al. | May 6, 1958 |
| 2,838,237 | Spaunburg et al. | June 10, 1958 |
| 2,903,184 | Weatherby | Sept. 8, 1959 |
| 2,905,926 | Aid | Sept. 22, 1959 |
| 2,935,229 | Robinson | May 3, 1960 |